(12) United States Patent
Ju

(10) Patent No.: US 6,753,871 B2
(45) Date of Patent: Jun. 22, 2004

(54) MEMORY ACCESS METHOD

(75) Inventor: Chi-cheng Ju, Taipei (TW)

(73) Assignee: Mediatek Inc., Hsin Chu City (TW)

( * ) Notice: Subject to any disclaimer, the term of this patent is extended or adjusted under 35 U.S.C. 154(b) by 243 days.

(21) Appl. No.: 10/126,694

(22) Filed: Apr. 22, 2002

(65) Prior Publication Data

US 2002/0175920 A1 Nov. 28, 2002

(30) Foreign Application Priority Data

Apr. 23, 2001 (TW) .................................... 90109842 A

(51) Int. Cl.[7] .............................................. G09G 5/39
(52) U.S. Cl. ...................................................... 345/531
(58) Field of Search ................................ 345/501, 530, 345/531, 564, 570, 547; 348/714–718; 711/100, 154, 157

(56) References Cited

U.S. PATENT DOCUMENTS 5,675,387 A * 10/1997 Hoogenboom et al. ..... 348/716
6,005,624 A * 12/1999 Vainsencher ................ 348/699

* cited by examiner

*Primary Examiner*—Kee M. Tung
(74) *Attorney, Agent, or Firm*—Birch, Stewart, Kolasch & Birch, LLP

(57) ABSTRACT

The invention provides a memory access method for overlapping partial boundary data in order to reduce or eliminate cross-page penalties when reading data. The method includes the step of a determining step to determine the maximum size of prediction blocks; a storing step to overlap partial boundary data from one side page of a page boundary into the other side page of the page boundary; and a reading step to read a prediction block from the page having all the data of the prediction block when the prediction block is at the page boundaries with overlapping data to eliminate cross-page penalties so as to increase the reading speed. Hence, the invention utilizes an overlapping method to eliminate cross-page penalties when reading the block data so as to increase the memory bandwidth as well as the reading speed.

20 Claims, 4 Drawing Sheets

| MB0 | MB1 | MB2 | MB3 | MB4 | | MB43 | MB44 |
|---|---|---|---|---|---|---|---|
| MB45 | MB46 | MB47 | MB48 | MB49 | ••• | MB88 | MB89 |
| MB90 | MB91 | MB92 | MB93 | MB94 | | MB133 | MB134 |
| MB135 [A1 A3] | MB136 [A2 A4] | MB137 | MB138 | MB139 | | MB178 | MB179 |
| MB180 | MB181 | | | | | | |
| MB225 | MB226 | | | | | | |
| MB270 | MB271 | | | | | | |
| MB315 | MB316 | | | | | | |

A ⟶ (points to A1–A4 region)

FIG. 1 (PRIOR ART)

MEMORY ACCESS METHOD

BACKGROUND OF THE INVENTION

1. Field of the Invention

The invention relates to a memory access method and, more particularly, to a memory access method of a video decoding system that utilizes a method of overlapping boundary data to reduce cross-page penalties when reading data.

2. Description of the Related Art

In many modern video decoding systems, such as MPEG-I, MPEG-II, and H261, inter-frame compression is used to reduce the redundancies between pictures and results in substantial data reduction. These systems all involve algorithms based on a common core of compression techniques, i.e. predictive and/or interpolative inter-frame encoding. The motion compensation is block-based and each prediction block has associated with motion vectors. The motion compensation operation involves reading the prediction blocks from reference pictures according to the motion vector information. Generally speaking, the reference pictures are quite large and typically stored in DRAM. The DRAM consists of several memory banks, and each bank in turns consists of many memory pages. Some additional overhead cycles, such as pre-charging and activating a memory page, are needed before accessing data in a memory page. Hence, when the current accessed page is different from the previous one, some overhead cycles, i.e. cross-page penalties, will occur. The cross-page penalties will significantly lower the bandwidth of reading prediction blocks from DRAM.

In order to reduce cross-page penalties, the prediction blocks should occupy as few pages as possible, and they should be read out page-by-page. FIG. 1 is a schematic diagram showing reference picture data stored in blocks. As shown in FIG. 1, the size of the reference picture is 720×576 pixels, and the size of each macro-block is 16×16 pixels. If the DRAM's page size is 1024 bytes, then each page may store four macro-blocks. The storing method in FIG. 1 is that each page (shown by thick lines) stores four vertical macro-blocks (shown by thin lines). When reading the dash-lined prediction block A, the data areas A1, A2, A3, and A4 of prediction block A are allocated in four different pages; therefore, it is necessary to have three cross-page penalties.

Although cross page penalties can be substantially reduced by page-by-page read sequence, it still becomes an inevitable and inherent DRAM bandwidth bottleneck in very high bandwidth applications such as HDTV video decoding. Especially, such high bandwidth application usually has real time decoding requirement. Hence, the burst and large memory read action during motion compensation process may fail to achieve real-time decoding due to excessive page crossings.

SUMMARY OF THE INVENTION

In view of the above-mentioned problems, the object of the invention is to provide a memory access method, in which a virtual page is formed through overlapping boundary data at page boundaries to logically enlarge DRAM page size so as to reduce or entirely prevent cross-page penalties.

In order to achieve the above-mentioned object, the memory access method of the invention is to overlap partial boundary data at page boundary in order to reduce or eliminate cross-page penalties when reading data. The method includes the following steps: the first is a determining step, to determine the maximum size of prediction blocks; the second is a storing step, to overlap partial boundary data at adjacent pages; and the final is a reading step, to read prediction block from the page having all the data of the prediction block when the prediction block is at the boundary with overlapping data.

Hence, the invention utilizes a method of overlapping boundary data to eliminate or reduce cross-page penalties when reading the block data so as to increase the memory bandwidth as well as the reading speed.

BRIEF DESCRIPTION OF THE DRAWINGS

FIG. 1 is a schematic diagram showing reference picture data stored in blocks.

DESCRIPTION OF THE PREFERRED EMBODIMENTS

A memory access method according to an embodiment of the invention will be described below in detail with reference to the drawings.

In FIG. 2(A), the pages M and N are two horizontally adjacent pages. The prediction block A is entirely enclosed by page M; therefore, there will not be any cross-page penalties when the system reads the prediction block A. However, as shown in FIG. 2(B), when the prediction block A is located right by one pixel position, a column data of the prediction block A is located in page N. Thus, when the system reads the prediction block A, a cross-page penalty from page M to page N will occur. Therefore, in order to prevent the cross-page penalty, the memory access method of the invention overlaps partial boundary data of page M into page N, as shown in the cross-shaded area in FIG. 2(C). The width of the overlapping area is the width of the prediction block A minus 1. The cross-shaded area data are duplicate stored in both page M and N.

Figure 2:
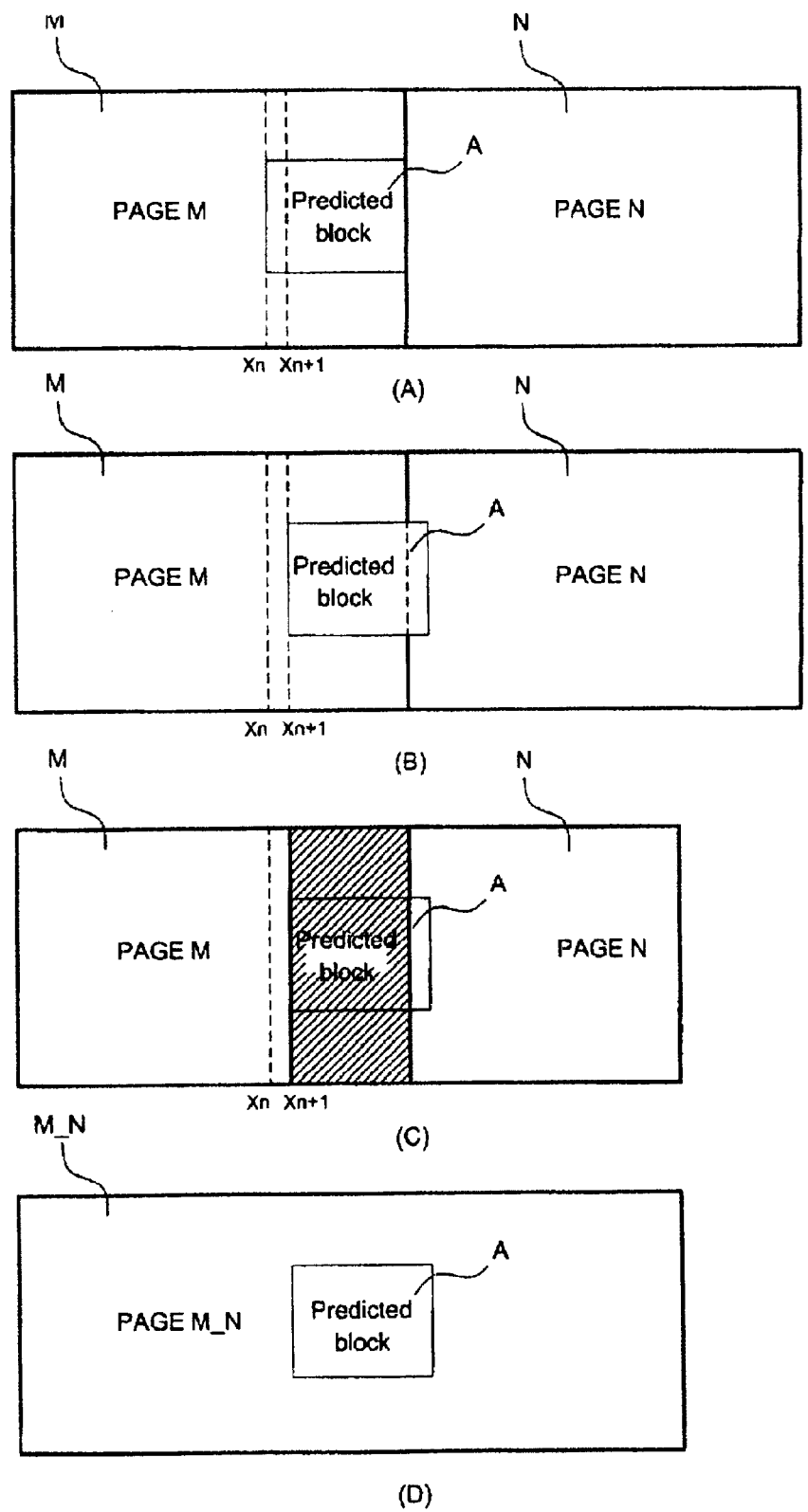
FIG. 2 is a diagram illustrating the principle of merging two pages into one virtual page, wherein (A) shows that the prediction block A is at page M; (B) illustrates that the prediction block A is right shifted by one pixel and is now occupying both pages of M and N; (C) illustrates that the boundary data of page M is overlapped to page N; and (D) shows the resulting virtual page M_N.

By the overlapping boundary data technique, when the system detects the prediction block A will run cross the vertical boundary of page M, the system will read out the data of the prediction block A from page N, and because the prediction block A is entirely enclosed by page N, no page crossing results. Therefore, from system viewpoint, the pages M and N can be treated as a whole virtual page M_N, as shown in FIG. 2(D). Consequently, as long as the prediction block A is positioned within the virtual page M_N, it can be entirely enclosed either by page M or page N and the system reads the data of the prediction block from the page which entirely encloses the prediction block A. In this way, no any cross-page penalty occurs at the vertical boundary. By the technique of generating a virtual page, it is possible to logically enlarge the size of a page through overlapping boundary data between the adjacent pages. FIG. 2 shows an example of removing a vertical page boundary, and in the same way, the same technique can be applied to remove a horizontal page boundary as well.

The necessary conditions of creating virtual page are described as follows. First, the overlapping area is determined by the maximum possible size of a prediction block. Define $W_{max}$ and $H_{max}$ as the maximum width and height of the prediction blocks, respectively and the unit of the $W_{max}$ and $H_{max}$ is pixel. For example, in MPEG I, the prediction block size with half pixel precision contains 16×16, 17×17, 16×17, and 17×16. Among these sizes, the maximum width $W_{max}$ and maximum height $H_{max}$ are both 17; that is $W_{max}=17$ and $H_{max}=17$.

Second, assume that the DRAM page size is $S_{page}$ and the shape of each page to store reference picture data is rectangular. Define $W_{page}$ and $H_{page}$ as the pixel width and pixel height for each rectangular page, respectively. If the vertical page boundary is desired to be removed as in FIG. 2, the necessary condition $W_{page}\gamma W_{max}$ must be satisfied and the number of overlapping columns, $W_{dup}$, between two horizontally adjacent pages is $W_{max}-1$. The width of merged virtual page is $(2*W_{page-(Wmax}-1))$. On the other hand, if the horizontal page boundary is desired to be removed, the necessary condition $H_{page}\gamma H_{max}$ must be satisfied and the number of overlapping rows, $H_{dup}$, between two vertically adjacent pages is $H_{max}-1$. The height of merged virtual page is $(2*H_{page}-(H_{max}-1))$. Both the horizontal and vertical page boundaries can be removed at the same time. Furthermore, we can recursively perform the same procedure to merge virtual pages we just created. Thus, with merging adjacent pages into larger virtual pages, the cross-page penalties when reading the prediction blocks can be dramatically and substantially reduced.

Figure 3:
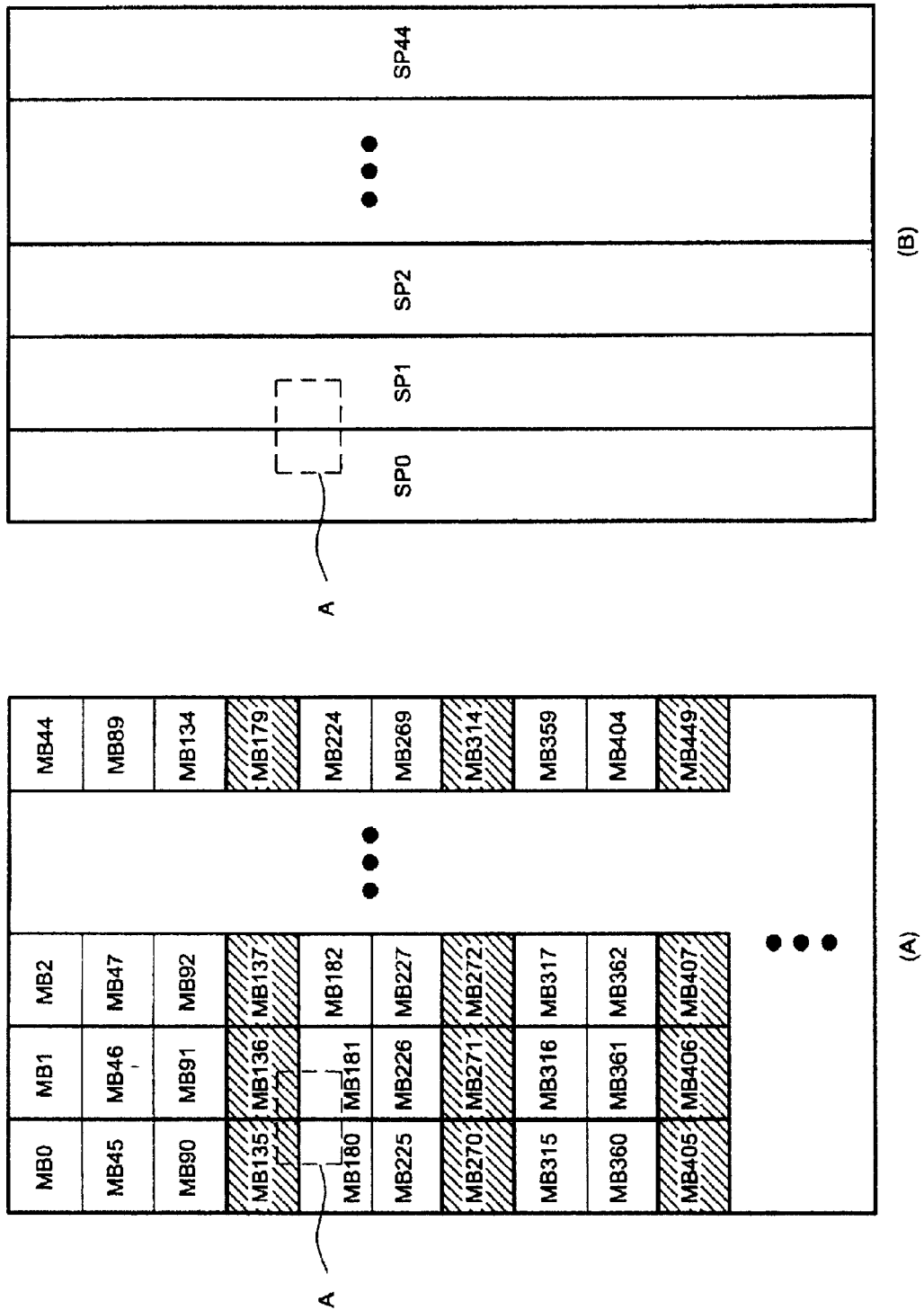
FIG. 3 is a diagram showing an example of the invention that illustrates all the horizontal page boundaries have been removed, wherein (A) shows the overlapping storage of each page; and (B) shows resulting equivalent virtual page arrangement.

FIG. 3 is a diagram showing an example of the invention that illustrates all the horizontal page boundaries have been removed, wherein (A) shows overlapping storage of each page; and (B) shows resulting equivalent virtual page arrangement. For example in MPEG I specification, the size of each macro-block is 16×16 pixels, and the maximum height, $H_{max}$, of prediction blocks is 17. Assume the size of each page in memory can store four macro-blocks, and then the height of each page, $H_{page}$, is 64. Since the condition $H_{page}\gamma H_{max}$ is satisfied, the horizontal page boundary between vertically adjacent pages can then be removed. Besides, the number of overlapping rows, $H_{dup}$, between each of the vertically adjacent pages is 16, $H_{max}\square 1$, and this number happens to be the height of a macro-block. Therefore, the system overlaps the upper macro-blacks row of each horizontal boundary into the adjacent pages under the horizontal boundary, as shown in the cross-shaded area in FIG. 3.

For example shown in FIG. 3, assume the reference picture size is 720×576 pixels; the number of stored pixel rows without overlapping boundary data is 576 rows. When applying the overlapping method, 16 rows between vertical adjacent pages need to be stored twice and total 176 rows are duplicate stored. The number of stored rows is 752 rows, which increased about one third of the original number. Although the size of the memory needs to be increased, the horizontal page boundaries have be removed to improve the speed for reading the prediction blocks. Referring to FIG. 3(B), the horizontal boundary of each page has been removed, so the height of the virtual page SP0~SP44 has been extended. In other words, the invention increases the size of memory to exchange for higher DRAM bandwidth. Since the trend of DRAM storage development is that the storage size increasing much faster than bandwidth. From system viewpoint, the DRAM bandwidth will become more and more important than DRAM storage. Consequently, it is worth exchange storage for bandwidth. In FIG. 3(A), since the width of the page $W_{page}$ is smaller than the maximum width $W_{max}$ of the prediction block, it is impossible to remove the vertical page boundary.

Figure 4:
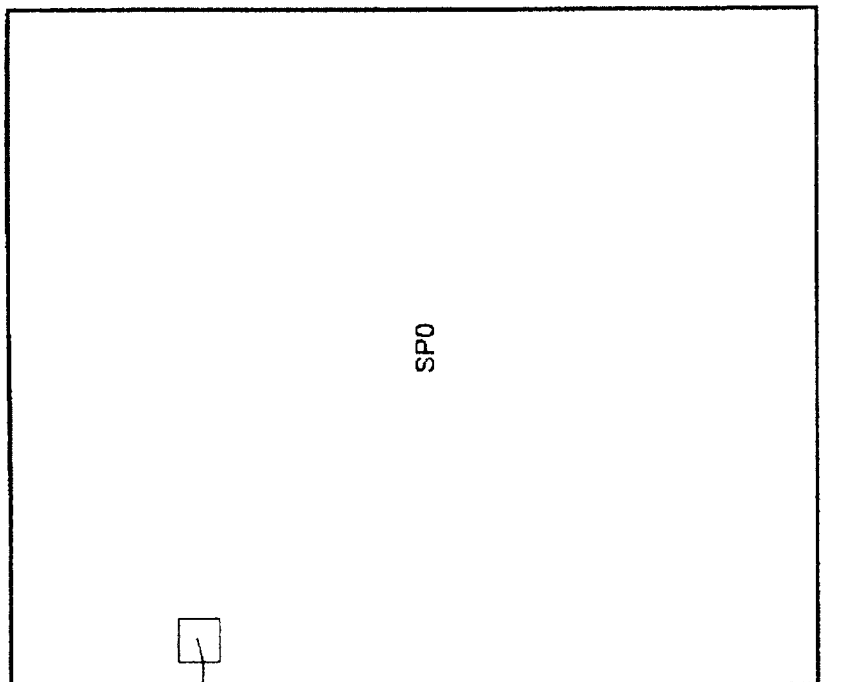
FIG. 4 is a diagram showing an example of the invention that illustrates all the horizontal and vertical page boundaries have been removed, wherein (A) shows overlapping storage of each page; and (B) shows resulting equivalent single virtual page.
Figure 4:
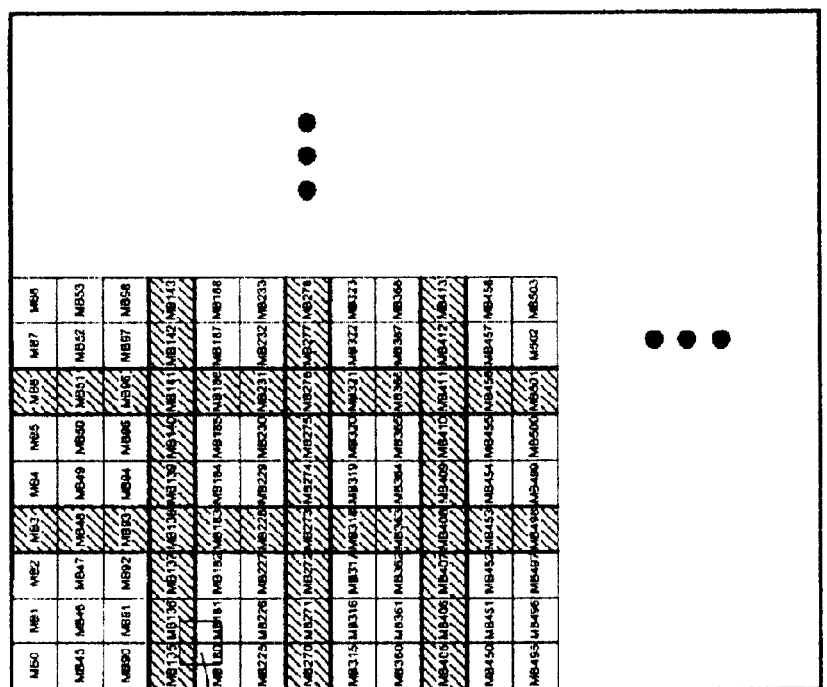

FIG. 4 is a diagram showing an example of the invention that illustrates all the horizontal and vertical page boundaries have been removed, wherein (A) shows overlapping storage of each page; and (B) shows resulting equivalent single virtual page. For example in MPEG I specification, the size of each macro-block is 16×16 pixels, and the maximum height of prediction blocks $H_{max}$ is 17. Assume the size of the page can store 16 macro-blocks, and then the height $H_{page}$ and width $W_{page}$ for each page are all 64. Thus, the conditions $H_{page}\gamma H_{max}$ and $W_{page}\gamma W_{max}$ are all satisfied. Therefore, the vertical page boundaries between horizontally adjacent pages can be removed, and the horizontal page boundary between vertically adjacent pages can be removed as well. Besides, the number of overlapping rows $H_{dup}$ and columns $W_{dup}$ between each of vertical and horizontal page boundary are both 16, i.e. $H_{max}-1$ or $W_{max}-1$, and these numbers happen to be the height and the width of a macro-block. Therefore, the system overlaps the upper macro-blacks row of each horizontal boundary into the adjacent pages under the horizontal boundary and overlaps left macro-blacks column of each vertical boundary into the right pages of each vertical boundary, as shown in the cross-shaded area in FIG. 4.

For example shown in FIG. 4, assume the reference picture size is 720×576 pixels, the number of stored rows after applying the overlapping method increases from 576 to 752 and the number of stored columns increases from 720 to 944. Hence, with the overlapping method, the number of stored rows and columns has increased about one third of their original numbers. Although the size of the memory needs to be increased, all the boundaries for each page can then be removed. As shown in FIG. 4(B), there is only one whole virtual page SP0. Therefore, when the system reads any prediction block, no cross-page penalties occur. Hence, the speed for reading the prediction blocks can be dramatically enhanced. Thus, after the reference pictures have been stored in the memory according to the method of the invention, the system will not encounter any cross-page penalties when reading any prediction block. Therefore, in the very high bandwidth real-time applications, the bottleneck that the bandwidth has been encountered due to the cross-page penalties can then be overwhelmingly overcome.

The specific embodiment described above is only intended to illustrate the invention; it does not, however, to limit the invention to the specific embodiment. Accordingly, various modifications and changes may be made without departing from the spirit and scope of the invention as described in the appended claims.

What is claimed is:

1. A memory access method for accessing reference pictures from memory by blocks, the method comprising the following steps:

a determining step for determining the maximum size of prediction blocks;

a storing step for overlapping partial boundary data on page boundaries; and a reading step for reading a prediction block from the page having all the data of the prediction block when the prediction block is at the page boundaries with overlapping data to eliminate cross-page penalties.

2. The memory access method as claimed in claim 1, wherein the maximum size for the prediction blocks is a maximum height.

3. The memory access method as claimed in claim 2, wherein the storing step is to overlap partial boundary data at horizontal boundaries and the overlapping row is equal to or larger than the maximum height −1.

4. The memory access method as claimed in claim 3, wherein the height of the pages of horizontal overlapping boundaries is equal to or larger than the maximum height of the prediction block.

5. The memory access method as claimed in claim 4, wherein the reading step reads prediction block from the page with overlapping boundary data when the prediction block crosses the horizontal page boundary.

6. The memory access method as claimed in claim 1, wherein the maximum size for the prediction blocks is a maximum width.

7. The memory access method as claimed in claim 6, wherein the storing step is to overlap partial boundary data at vertical boundaries and the overlapping column is equal to or larger than the maximum width −1.

8. The memory access method as claimed in claim 7, wherein the width of the pages of vertical overlapping boundaries is equal to or larger than the maximum width of the prediction block.

9. The memory access method as claimed in claim 8, wherein the storing step reads prediction block from the page with overlapping boundary data when the prediction block crosses the vertical page boundary.

10. The memory access method as claimed in claim 1, wherein the maximum size for the prediction blocks includes a maximum height and a maximum width.

11. The memory access method as claimed in claim 10, wherein the reading step is to overlap partial boundary data at vertical boundaries and horizontal boundaries.

12. The memory access method as claimed in claim 11, wherein the height and width of the page is equal to or larger than the maximum height and width of the prediction block, respectively.

13. The memory access method as claimed in claim 12, wherein the reading step reads the prediction block from the page with overlapping boundary data when the prediction block crosses the vertical and/or horizontal page boundaries.

14. A memory storage method for storing reference pictures into memory by blocks, the memory storage method comprising the following steps:

a determining step for determining the maximum size of prediction blocks; and a storing step for overlapping partial boundary data on page boundaries.

15. The memory storage method as claimed in claim 14, wherein the maximum size is a maximum height.

16. The memory storage method as claimed in claim 15, wherein the overlapping step is to overlap partial boundary data at horizontal boundaries and the overlapping row is equal to or larger than the maximum height −1.

17. The memory storage method as claimed in claim 16, wherein the height of the pages of horizontal overlapping boundaries is equal to or larger than the maximum height of the prediction block.

18. The memory storage method as claimed in claim 14, wherein the maximum size is a maximum width.

19. The memory storage method as claimed in claim 18, wherein the overlapping step is to overlap partial boundary data at vertical boundaries and the overlapping row is equal to or larger than the maximum width −1.

20. The memory storage method as claimed in claim 19, wherein the width of the pages of vertical overlapping boundaries is equal to or larger than the maximum width of the prediction block.

* * * * *